United States Patent
Hudson

(10) Patent No.: US 11,028,752 B2
(45) Date of Patent: Jun. 8, 2021

(54) REDUCTANT INSERTION ASSEMBLY COMPRISING A BLADDER

(71) Applicant: CUMMINS EMISSION SOLUTIONS INC., Columbus, IN (US)

(72) Inventor: Patrick C. Hudson, Indianapolis, IN (US)

(73) Assignee: Cummins Emission Solutions Inc., Columbus, IN (US)

(*) Notice: Subject to any disclaimer, the term of this patent is extended or adjusted under 35 U.S.C. 154(b) by 0 days.

(21) Appl. No.: 16/968,320

(22) PCT Filed: Feb. 12, 2018

(86) PCT No.: PCT/US2018/017841
§ 371 (c)(1),
(2) Date: Aug. 7, 2020

(87) PCT Pub. No.: WO2019/156690
PCT Pub. Date: Aug. 15, 2019

(65) Prior Publication Data
US 2021/0025310 A1    Jan. 28, 2021

(51) Int. Cl.
*F01N 3/20* (2006.01)
*F01N 9/00* (2006.01)

(52) U.S. Cl.
CPC ............ *F01N 3/2066* (2013.01); *F01N 9/00* (2013.01); *F01N 2290/10* (2013.01); *F01N 2560/026* (2013.01); *F01N 2560/08* (2013.01); *F01N 2610/02* (2013.01); *F01N 2610/144* (2013.01); *F01N 2610/1406* (2013.01); *F01N 2900/1808* (2013.01); *F01N 2900/1822* (2013.01)

(58) Field of Classification Search
CPC combination set(s) only.
See application file for complete search history.

(56) References Cited

U.S. PATENT DOCUMENTS 6,550,250 B2 *   4/2003   Mikkelsen ......... B01D 53/9404
                                                        60/685
7,454,898 B2 *  11/2008   Allgeier ........... B60K 15/03006
                                                        60/286

(Continued)

FOREIGN PATENT DOCUMENTS

WO    WO-2011/048292 A2    4/2011

OTHER PUBLICATIONS

International Search Report and Written Opinion in PCT Application No. PCT/US2018/017841, dated Jun. 7, 2018.

*Primary Examiner* — Binh Q Tran
(74) *Attorney, Agent, or Firm* — Foley & Lardner LLP

(57) ABSTRACT

A reductant insertion assembly comprises a reductant bladder defining a bladder internal volume for holding a reductant. The reductant bladder comprises a bladder inlet and a bladder outlet. A pressure sensor is positioned downstream of the bladder outlet. The pressure sensor is operable to sense a pressure of the reductant downstream of the reductant bladder, and generate a pressure signal indicative of the pressure. A compression mechanism is operably coupled to the reductant bladder. The compression mechanism is configured to selectively exert a compressive force on the reductant bladder so as to expel the reductant therefrom via the bladder outlet. The compression mechanism exerts the compressive force in response to the pressure signal.

25 Claims, 8 Drawing Sheets

(56) References Cited

U.S. PATENT DOCUMENTS

| | | | |
|---|---|---|---|
| 7,578,321 B2* | 8/2009 | Levin | F01N 3/2066 |
| | | | 141/55 |
| 2004/0025498 A1* | 2/2004 | Lambert | F02M 53/00 |
| | | | 60/286 |
| 2007/0277505 A1 | 12/2007 | Dawson et al. | |
| 2008/0037908 A1 | 2/2008 | Kunstmann et al. | |
| 2009/0013670 A1* | 1/2009 | Cooke | F01N 3/2066 |
| | | | 60/286 |
| 2009/0101656 A1 | 4/2009 | Leonard | |
| 2011/0209465 A1 | 9/2011 | Novellani et al. | |
| 2014/0338311 A1 | 11/2014 | Brueck et al. | |
| 2015/0068194 A1 | 3/2015 | Gottwald | |
| 2016/0030886 A1* | 2/2016 | Dougnier | F01N 3/0842 |
| | | | 435/303.2 |

* cited by examiner

REDUCTANT INSERTION ASSEMBLY COMPRISING A BLADDER

CROSS REFERENCE TO RELATED APPLICATIONS

The present application is a national stage application of PCT Application No. PCT/US2018/017841, filed Feb. 12, 2018, the contents of which are incorporated herein by reference in their entirety.

TECHNICAL FIELD

The present disclosure relates generally to aftertreatment systems for use with internal combustion (IC) engines.

BACKGROUND

Exhaust aftertreatment systems are used to receive and treat exhaust gas generated by IC engines. Generally exhaust gas aftertreatment systems comprise any of several different components to reduce the levels of harmful exhaust emissions present in exhaust gas. For example, certain exhaust gas aftertreatment systems for diesel-powered IC engines comprise a selective catalytic reduction (SCR) system, including a catalyst formulated to convert NOx (NO and $NO_2$ in some fraction) into harmless nitrogen gas ($N_2$) and water vapor ($H_2O$) in the presence of ammonia ($NH_3$). Generally in such aftertreatment systems, an exhaust reductant (e.g., a diesel exhaust fluid such as urea) is injected into the SCR system to provide a source of ammonia and mixed with the exhaust gas to partially reduce the NOx gases. The reduction byproducts of the exhaust gas are then fluidly communicated to the catalyst included in the SCR system to decompose substantially all of the NOx gases into relatively harmless byproducts that are expelled out of the aftertreatment system.

Aftertreatment systems generally comprise a reductant insertion assembly for inserting a reductant into the SCR system. Conventional reductant insertion assemblies generally include one or more pumps with motors and/or other moving parts to pressurize and deliver the reductant to the SCR system. The reductant can form deposits in the pumps and may cause corrosion in the pump causing increased pump failure rates, limited flow rates, and frequent maintenance, thereby raising maintenance costs.

SUMMARY

Embodiments described herein relate generally to systems and methods for inserting a reductant into an aftertreatment component, for example an SCR system. Various embodiments described herein comprise a reductant insertion assembly including a reductant bladder which holds the reductant, and a compression mechanism which selectively exerts a compressive force on the reductant bladder in response to a pressure signal, so as to deliver a reductant to an injector of an aftertreatment system including the SCR system.

In a first set of embodiments, a reductant insertion assembly comprises a reductant bladder defining a bladder internal volume for holding a reductant. The reductant bladder comprises a bladder inlet and a bladder outlet. A pressure sensor is positioned downstream of the bladder outlet. The pressure sensor is operable to sense a pressure of the reductant downstream of the reductant bladder, and generate a pressure signal indicative of the pressure. A compression mechanism is operably coupled to the reductant bladder. The compression mechanism is configured to selectively exert a compressive force on the reductant bladder so as to expel the reductant therefrom via the bladder outlet. The compression mechanism exerts the compressive force in response to the pressure signal.

In another set of embodiments, an aftertreatment system for use with an engine producing an exhaust gas includes: a selective catalytic reduction system configured to decompose constituents of the exhaust gas; and a reductant insertion assembly fluidly coupled to the selective catalytic reduction system and configured to insert a reductant therein, the reductant insertion assembly comprising: a reductant bladder defining a bladder internal volume for holding a reductant, the reductant bladder comprising a bladder inlet and a bladder outlet, a pressure sensor positioned downstream of the bladder, the pressure sensor operable to sense a pressure of the reductant downstream of the reductant bladder, and generate a pressure signal indicative of the pressure, and a compression mechanism operably coupled to the reductant bladder, the compression mechanism configured to selectively exert a compressive force on the reductant bladder so as to expel the reductant therefrom via the bladder outlet, the compression mechanism exerting the compressive force in response to the pressure signal.

In yet another set of embodiments, a method of delivering a reductant to an aftertreatment system from a reductant insertion assembly which comprises a reductant bladder, comprises determining a pressure of a reductant in a reductant delivery line fluidly coupled to a bladder outlet of the reductant bladder. It is determined if the pressure is less than a predetermined low pressure threshold. In response to the pressure being less than the predetermined low pressure threshold, a compressive force is exerted on the reductant bladder so as to increase a pressure of the reductant in the reductant deliver line.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF THE DRAWINGS

The foregoing and other features of the present disclosure will become more fully apparent from the following description and appended claims taken in conjunction with the accompanying drawings. Understanding that these drawings depict only several implementations in accordance with the disclosure and are therefore not to be considered limiting of its scope, the disclosure will be described with additional specificity and detail through use of the accompanying drawings.

Figure 1:
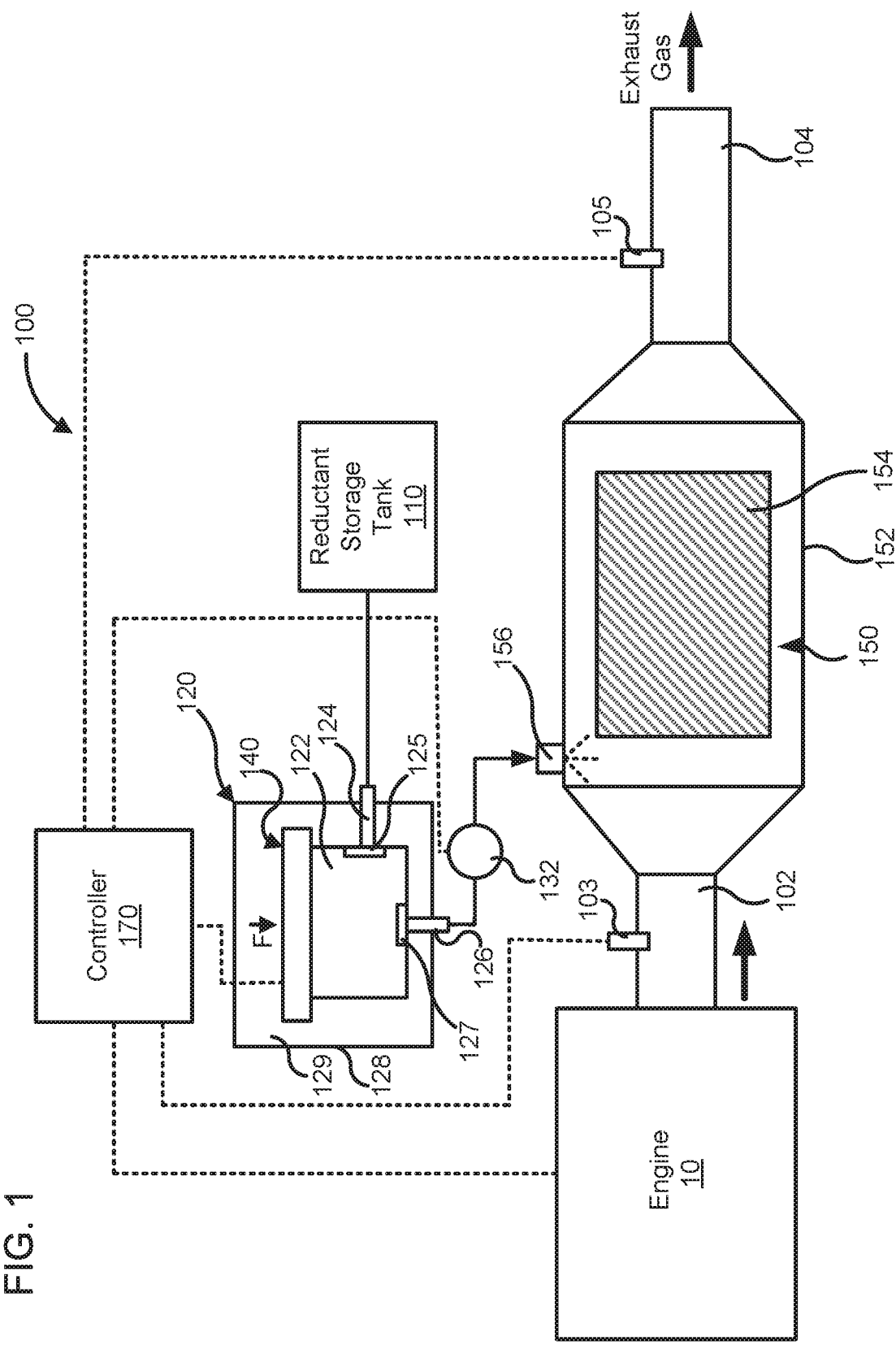
FIG. 1 is a schematic illustration of an aftertreatment system, according to an embodiment.

Reference is made to the accompanying drawings throughout the following detailed description. In the drawings, similar symbols typically identify similar components unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and made part of this disclosure.

DETAILED DESCRIPTION

Embodiments described herein relate generally to systems and methods for inserting a reductant into a SCR system. Various embodiments described herein comprise a reductant insertion assembly including a reductant bladder which holds the reductant, and a compression mechanism which selectively exerts a compressive force on the reductant bladder in response to a pressure signal, so as to deliver a reductant to an injector of an aftertreatment system including the SCR system.

Aftertreatment systems generally comprise a reductant insertion assembly for inserting a reductant into the SCR system. Conventional reductant insertion assemblies generally include one or more pumps with motors and/or other moving parts to pressurize and deliver the reductant to the SCR system. The reductant can form deposits in the pumps and/or may cause corrosion in the pump causing increased pump failure rates, limited flow rates, and frequent maintenance, thereby raising maintenance costs.

Various embodiments of the systems and methods described herein may provide benefits including, for example: (1) providing a reductant insertion assembly which does not use any reductant pumps for pumping the reductant, thereby eliminating problems related to reductant pump failure from reductant deposits and corrosion; (2) simplifying reductant pressure control by replacing multiple moving parts with a reductant bladder; (3) allowing large variations in flow rate; and (4) reducing maintenance costs.

FIG. 1 is a schematic illustration of an aftertreatment system 100, according to an embodiment. The aftertreatment system 100 is configured to receive an exhaust gas (e.g., a diesel exhaust gas) from an engine 10 (e.g., a diesel engine, a dual fuel engine, etc.) and reduce constituents of the exhaust gas such as, for example, NOx gases, CO, hydrocarbons, etc. The aftertreatment system 100 may comprise a reductant storage tank 110, a reductant insertion assembly 120 and an aftertreatment component 150. In some embodiments, the aftertreatment system 100 may also comprise a controller 170.

The aftertreatment system 100 comprises a housing 152 defining an internal volume within which at least one aftertreatment component 150 configured to decompose constituents of an exhaust flowing therethrough, is positioned. The housing 152 may be formed from a rigid, heat-resistant and corrosion-resistant material, for example stainless steel, iron, aluminum, metals, ceramics, or any other suitable material. The housing 152 may have any suitable cross-section, for example circular, square, rectangular, oval, elliptical, polygonal, or any other suitable shape.

In some embodiments, the aftertreatment component 150 comprises a SCR system. In other embodiments, the aftertreatment component 150 may comprise a selective catalytic reduction filter (SCRF) system, or any other aftertreatment component, configured to decompose constituents of the exhaust gas (e.g., NOx gases such as such nitrous oxide, nitric oxide, nitrogen dioxide, etc.), flowing through the aftertreatment system 100 in the presence of a reductant, as described herein.

Although FIG. 1 shows only the aftertreatment component 150 positioned within the internal volume defined by the housing 152, in other embodiments, a plurality of aftertreatment components may be positioned within the internal volume defined by the housing 152 in addition to or in place of the aftertreatment component 150. Such aftertreatment components may comprise, for example, filters (e.g., particulate matter filters, catalyzed filters, etc.), oxidation catalysts (e.g., carbon monoxide, hydrocarbons and/or ammonia oxidation catalysts), mixers, baffle plates, or any other suitable aftertreatment component.

An inlet conduit 102 is fluidly coupled to an inlet of the housing 152 and configured to receive exhaust gas from an engine 10 (e.g., a diesel engine, a gasoline engine, a biodiesel engine, a natural gas engine, a dual fuel engine, etc.) and to communicate the exhaust gas to an internal volume defined by the housing 152. Furthermore, an outlet conduit 104 may be coupled to an outlet of the housing 152 and configured to expel treated exhaust gas into the environment.

A first sensor 103 may be positioned in the inlet conduit 102. The first sensor 103 may comprise a NOx sensor, for example a physical or virtual NOx sensor, configured to determine an amount of NOx gases included in the exhaust gas being emitted by the engine 10. In various embodiments, an oxygen sensor, a temperature sensor, a pressure sensor, or any other sensor may also be positioned in the inlet conduit 102 so as to determine one or more operational parameters of the exhaust gas flowing through the aftertreatment system 100. In particular embodiments, the first sensor 103 may comprise a virtual sensor.

A second sensor 105 may be positioned in the outlet conduit 104. The second sensor 105 may comprise a second NOx sensor configured to determine an amount of NOx gases expelled into the environment after passing through the aftertreatment component 150.

The aftertreatment component 150 comprises a catalyst 154 formulated to decompose constituents of an exhaust gas, for example NOx gases, flowing through the aftertreatment system 100. An injector 156 may be provided on a sidewall of housing 152 and may be in fluid communication with the internal volume of the housing 152, for example via a reductant insertion port defined on a sidewall of the housing 152. The injector 156 is configured to selectively insert a reductant into the internal volume defined by the housing 152. The injector 156 may be positioned upstream of the catalyst 154 (e.g., to allow the reductant to be inserted into the exhaust gas upstream of the catalyst 154) or over the catalyst 154 (e.g., to allow reductant to be inserted directly on the catalyst 154).

The catalyst 154 is formulated to selectively decompose constituents of the exhaust gas. Any suitable catalyst can be used such as, for example, platinum, palladium, rhodium, cerium, iron, manganese, copper, vanadium based catalyst, any other suitable catalyst, or a combination thereof. The catalyst 154 can be disposed on a suitable substrate such as, for example, a ceramic (e.g., cordierite) or metallic (e.g., kanthal) monolith core which can, for example, define a honeycomb structure. A washcoat can also be used as a carrier material for the catalyst 154. Such washcoat materials may comprise, for example, aluminum oxide, titanium dioxide, silicon dioxide, any other suitable washcoat material, or a combination thereof. The exhaust gas (e.g., diesel exhaust gas) can flow over and/or about the catalyst 154 such that any NOx gases included in the exhaust gas are further reduced to yield an exhaust gas which is substantially free of NOx gases.

The reductant storage tank 110 is configured to store the reductant. The reductant is formulated to facilitate decomposition of the constituents of the exhaust gas (e.g., NOx gases included in the exhaust gas). Any suitable reductant can be used. In some embodiments, the exhaust gas comprises a diesel exhaust gas and the reductant comprises a diesel exhaust fluid. For example, the diesel exhaust fluid may comprise urea, an aqueous solution of urea, or any other fluid that comprises ammonia, by-products, or any other diesel exhaust fluid as is known in the arts (e.g., the diesel exhaust fluid marketed under the name ADBLUE®). For example, the reductant may comprise an aqueous urea solution having a particular ratio of urea to water. In particular embodiments, the reductant can comprise an aqueous urea solution including 32.5% by volume of urea and 67.5% by volume of deionized water.

A reductant insertion assembly 120 is fluidly coupled to the reductant storage tank 110. The reductant insertion assembly 120 is configured to selectively insert the reductant into the aftertreatment component 150 or upstream thereof (e.g., into the inlet conduit 102) or a mixer (not shown) positioned upstream of the aftertreatment component 150.

The reductant insertion assembly 120 comprises a reductant bladder 122 defining a bladder internal volume for holding the reductant. The reductant bladder 122 comprises a bladder inlet 124 for receiving the reductant, for example from the reductant storage tank 110, and a bladder outlet 126, for delivering the reductant to the injector 156.

The reductant bladder 122 may comprise a bag, a pouch, a tube, a balloon, or any other container formed from a flexible or a foldable material which can experience an increase or decrease in the bladder internal volume thereof. For example, the reductant bladder 122 may comprise an inflatable pouch which may be selectively inflated (e.g., via stretching of sidewalls thereof) when reductant is communicated into the bladder internal volume from the reductant storage tank 110 via the bladder inlet 124. Furthermore, the reductant bladder 122 may be selectively deflated (e.g., by applying a compressive force, as described below in detail herein) to expel the reductant therefrom via the bladder outlet 126.

In other embodiments, the sidewalls of the reductant bladder 122 may foldable. In such embodiments, the sidewalls of the reductant bladder 122 may be selectively unfolded for communicating the reductant into the bladder internal volume, and selectively folded (e.g., by applying a compressive force, as described below in detail herein) so as to decrease its bladder internal volume and expel the reductant therefrom.

The reductant bladder 122 may be formed from any suitable flexible material. Suitable materials include but are not limited to TEFLON®, rubber, polymers, elastomers (e.g., buna nitrile, low temperature buna nitrile, extreme low temperature nitrile, extreme high temperature nitrile, butyl, ethylene propylene, fluoro elastomer, acrylonitrile butadiene, ethylene oxide epichlorohydrin, etc.), natural or synthetic leathers, fabric, any other suitable material or a combination thereof.

A pressure sensor 132 is positioned downstream of the bladder outlet 126. The pressure sensor 132 is operable to sense a pressure of the reductant downstream of the reductant bladder 122. For example, the pressure sensor 132 may be positioned in a reductant delivery line fluidly coupling the bladder outlet 126 to the injector 156.

The injector 156 may be configured to deliver the reductant into the aftertreatment component 150 within a predetermined pressure range. The reductant insertion assembly 120 is configured to maintain the pressure of the reductant in the reductant delivery line within the predetermined pressure range. For example, the pressure signal may be used to determine if the pressure downstream from the reductant bladder 122 has dropped below a predetermined low pressure threshold (e.g., a lower bound of the predetermined pressure range), more reductant should be expelled from the reductant bladder 122, so as to increase a pressure of the reductant in the reductant delivery line to fall within the predetermined pressure range, as described below in further detail herein.

In some embodiments, the reductant insertion assembly 120 also comprises a bladder housing 128 defining a bladder housing internal volume 129. The reductant bladder 122 may be positioned inside the bladder housing internal volume 129. The bladder housing 128 may be formed via any suitable material such as, for example metals, plastic, polymers, etc. In some embodiments, the bladder housing 128 may comprise a cover which may be removable from the bladder housing 128 to allow access to the bladder housing internal volume 129, for example, for maintaining or replacing the reductant bladder 122 or any other component positioned within the bladder housing 128 (e.g., the compression mechanism 140).

The reductant bladder 122 may be coupled to the reductant storage tank 110 and the injector 156 through sidewalls of the bladder housing 128 via reductant delivery lines. Feedthroughs may be defined in the sidewall of the bladder housing 128. The feedthroughs may be hermetically sealed (e.g., via O-rings, polymeric connectors, adhesives, or any other suitable seal) so as to hermetically seal the bladder housing internal volume 129.

The reductant insertion assembly 120 also comprises a compression mechanism 140 operably coupled to the reductant bladder 122. The compression mechanism 140 is configured to selectively exert a compressive force on the reductant bladder 122 (e.g., as shown by the arrow F in FIG. 1) so as to expel the reductant therefrom via the bladder outlet 126. Furthermore, the compression mechanism 140 may exert the compressive force responsive to the pressure signal from the pressure sensor 132.

For example, if the pressure signal indicates that the pressure downstream of the bladder outlet 126 has fallen below the predetermined low pressure threshold, the compressive mechanism 140 may activate responsive to the pressure signal (e.g., via a bladder compression signal from the controller 170, as described below in detail herein). The compressive mechanism 140 then exerts a compressive force on the reductant bladder 122 so as to expel the reductant therefrom via the bladder outlet 126, thereby increasing the pressure downstream of the bladder outlet 126.

In some embodiments, once the pressure signal indicates that the pressure is above the predetermined low pressure threshold (e.g., within the predetermined pressure range), the compression mechanism 140 may deactivate so as release a pressure on the reductant bladder 122. In other embodiments, the compression mechanism 140 may continue exerting the compressive force on the reductant bladder 122 until the pressure downstream of the bladder outlet 126 reaches or exceeds a predetermined high pressure threshold. Once the predetermined high pressure threshold is reached, the compression mechanism 140 is deactivated, and the compressive force on the reductant bladder 122 removed until the downstream pressure once again drops below the low pressure threshold.

In particular embodiments, an inlet valve 125 may be positioned at the bladder inlet 124. The inlet valve 125 may be configured to selectively close so as to prevent backflow of the reductant from the bladder inlet 124 when the compression mechanism 140 is exerting the compressive force on the reductant bladder 122. The inlet valve 125 may include, for example a one way valve, a check valve (e.g., a ball check valve, a diaphragm check valve, a swing check-valve, a tilting disc check valve, a stop-check valve, a lift-check valve, an in-line check valve, etc.), a pressure activated valve, a non-return valve, a duckbill valve, a pneumatic non-return valve, or any other suitable valve or a combination thereof.

In other embodiments, an outlet valve 127 may also be positioned at the bladder outlet 126. The outlet valve 127 may be configured to selectively close to allow the reductant bladder 122 to be filled with the reductant when the compressive force is removed. The outlet valve 127 may be substantially similar to the inlet valve 125, and may include any suitable one-way valve as described with respect to the inlet valve 125.

In still other embodiments, the reductant insertion assembly 120 may be valve-less, that is no valve is employed in the reductant insertion assembly 120. For example, any valve (e.g., the inlet valve 125 and the outlet valve 127) provided in the reductant insertion assembly 120 may be susceptible to clogging, corrosion, or otherwise damage from the reductant in contact therewith, thereby leading to breakdowns and increased maintenance cost. Providing a valve-less reductant insertion assembly 120 may therefore reduce the maintenance costs by removing the valves which can become points of failure in the reductant insertion assembly 120.

In such embodiments, the bladder inlet 124 and the bladder outlet 126 may have a size and shape, or include features such that when no compressive force is being applied by the compression mechanism 140, the reductant is free to flow into the reductant bladder 122 from the reductant storage tank 110, for example via gravity driven flow, to replace any volume of the reductant that has been inserted into the aftertreatment component 150 by the injector 156. Furthermore, when the compressive force is exerted on the reductant bladder 122, the reductant is preferably communicated out of the bladder outlet 126 towards the injector 156, instead of being communicated back towards the reductant storage tank 110, such that no inlet valve (e.g., the inlet valve 125) or outlet valve (e.g., the outlet valve 127) are needed.

For example, in particular embodiments, a gravitational force acting on the reductant causing it to communicate from the reductant storage tank 110 to the reductant bladder 122 may be sufficient to overcome the compressive force. In other embodiments, the bladder outlet 126 may have a bladder outlet cross-section larger than a bladder inlet cross-section of the bladder inlet 124, thereby providing a path of least resistance for the reductant to flow out of the bladder outlet 126 when the compressive force is acting on the reductant bladder 122.

In still other embodiments, a flow restriction, for example a nozzle may be positioned in the bladder inlet 124. The flow restriction may be configured to allow reductant to flow freely into the reductant bladder 122 when the compressive force is removed, but resists backflow of the reductant from the reductant bladder 122 towards the reductant storage tank 110 when the compressive force is acting on the reductant bladder 122.

Figure 2A:
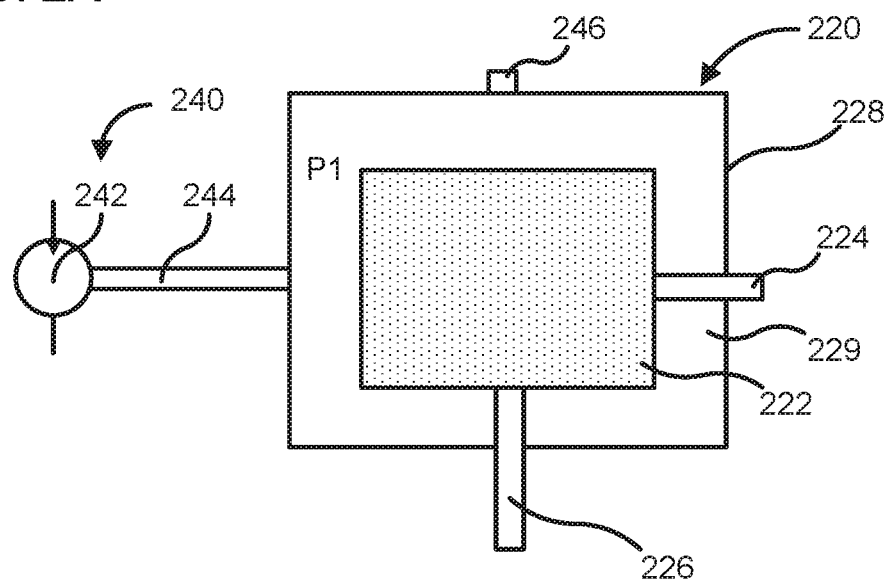
FIG. 2A is a schematic illustration of a reductant insertion assembly, according to an embodiment, in a first position.

Any suitable mechanism capable of exerting the compressive force on the reductant bladder 122 may be used in the reductant insertion assembly 120. In particular embodiments, the compression mechanism 140 comprises a pneumatic pump. For example, FIG. 2A is a schematic illustration of a reductant insertion assembly 220, according to an embodiment. The reductant insertion assembly 220 may be used in the aftertreatment system 100 or any other aftertreatment system described herein.

The reductant insertion assembly 220 comprises a reductant bladder 222 having a bladder inlet 224, and a bladder outlet 226, and a compression mechanism 240. The reductant bladder 222 is positioned within a bladder housing internal volume 229 of a bladder housing 228. The reductant bladder 222, and the bladder housing 228 may be substantially similarly to the reductant bladder 122 and the bladder housing 128, respectively as described with respect to the reductant insertion assembly 120 and, therefore not described in further detail herein.

The compression mechanism 240 comprises a pneumatic pump 242 capable of pumping a gas (e.g., air, nitrogen, a noble gas, or any other gas). The pneumatic pump 242 is fluidly coupled to the bladder housing internal volume 229 via a conduit 244 (e.g., a tube, a pipe, a hose, etc.), and capable of communicating the gas therein. While described as including the pneumatic pump 242, in other embodiments, the compression mechanism 240 may comprise a hydraulic pump capable of pumping a liquid (e.g., water) into the bladder housing internal volume 229.

Figure 2B:
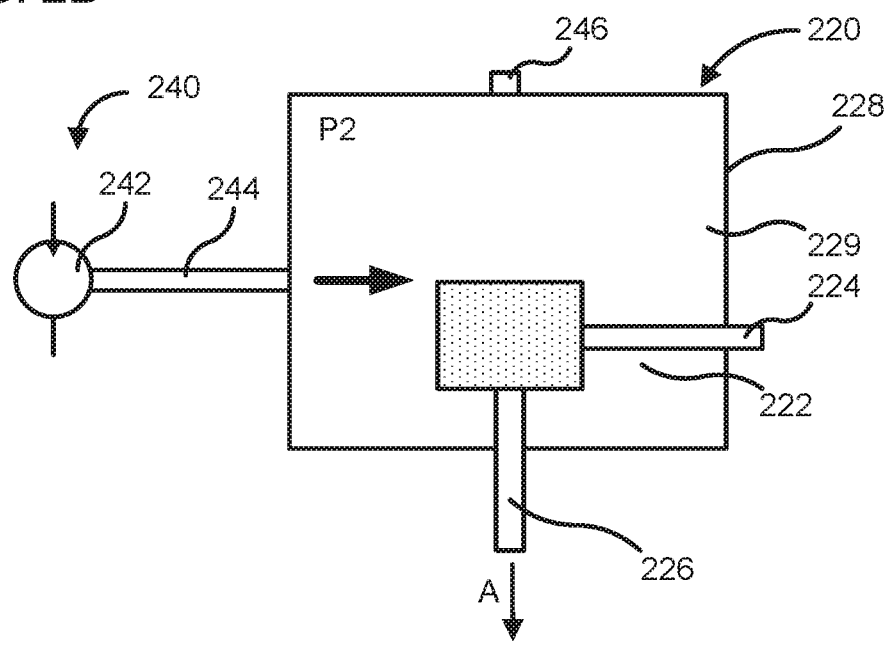
FIG. 2B is a schematic illustration of the reductant insertion assembly of FIG. 2A in a second position.

The reductant insertion assembly 220 may be moved between a first position shown in FIG. 2A, in which the reductant bladder 222 holds the reductant to its full capacity, and a second position shown in FIG. 2B, in which the reductant bladder 222 is compressed so as to force the reductant out thereof via the bladder outlet 226.

For example, FIG. 2A shows the reductant insertion assembly 220 in the first position. In the first position, the pneumatic pump 242 is deactivated (e.g., not powered, or turned OFF) and is not pumping the gas into the bladder housing internal volume 229, such that the bladder housing internal volume 229 is at a first pressure P1 (e.g., atmospheric pressure). The first pressure P1 may be less than a reductant pressure of the reductant being supplied to the reductant bladder 122 such that the reductant bladder 122 is filled with the reductant to its full capacity.

In the second position shown in FIG. 2B, the pneumatic pump 242 activates (e.g., is turned ON), for example in response to the pressure signal from a pressure sensor (e.g., the pressure sensor 132) which may indicate that a reductant pressure downstream of the bladder outlet 226 has fallen below a predetermined low pressure threshold, as described before herein. Activating the pneumatic pump 242 causes the gas to flow into the bladder housing internal volume 229 via the conduit 244. This raises the pressure in the bladder housing internal volume 229 to a second pressure P2, greater than the reductant pressure inside the reductant bladder 222. The higher second pressure P2 exerts a compressive force on the reductant bladder 222, thereby squeezing the reductant bladder 222 and causing the reductant to be expelled out of the reductant bladder 222 via the bladder outlet 226, as shown by the arrow A.

Once the desired reductant pressure downstream of the reductant bladder 222 is achieved (e.g., exceeds the predetermined low pressure threshold, or is within the predetermined pressure range), the pneumatic pump 242 may be deactivated so as to release the compressive force on the reductant bladder 222. In some embodiments, the pneumatic pump 242 may be operated as a suction pump so as to draw the gas out of the bladder housing internal volume 229, thereby reducing the pressure of the bladder housing internal volume 229.

In other embodiments, a valve 246 (e.g., a check valve, a pressure activated valve, a one way valve, or any other suitable valve) may be provided on a sidewall of the bladder housing 228. The valve 246 may be selective opened to vent the bladder housing internal volume 229 so as to reduce the pressure of the gas therein. In still other embodiments, the valve 246 may also serve as a pressure sensitive valve, which selectively opens once the gas pressure within the bladder housing internal volume 229 exceeds a high gas pressure threshold. In this manner, the valve 246 may protect the bladder housing 228 and/or the reductant bladder 222 from damage by excessively high gas pressure developing in the bladder housing internal volume 229.

Figure 3A:
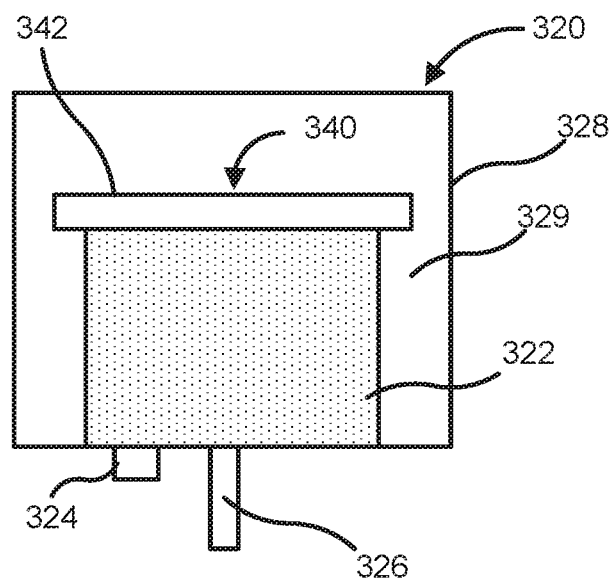
FIG. 3A is a schematic illustration of a reductant insertion assembly, according to another embodiment, in a first position.

In other embodiments, the compression mechanism 140 may comprise a mechanical compression mechanism. For example, FIG. 3A is a schematic illustration of a reductant insertion assembly 320, according to another embodiment. The reductant insertion assembly 320 may be used in the aftertreatment system 100 or any other aftertreatment system described herein.

The reductant insertion assembly 320 comprises a reductant bladder 322 having a bladder inlet 324 and a bladder outlet 326, and a compression mechanism 340. The reductant bladder 322 is positioned within a bladder housing internal volume 329 of a bladder housing 328. The reductant bladder 322 and the bladder housing 328 may be substantially similarly to the reductant bladder 122 and the bladder housing 128, respectively as described with respect to the reductant insertion assembly 120 and, therefore not described in further detail herein. Furthermore, at least portion of the reductant bladder 322 is in contact with an inner surface of a sidewall of the bladder housing 328.

Figure 3B:
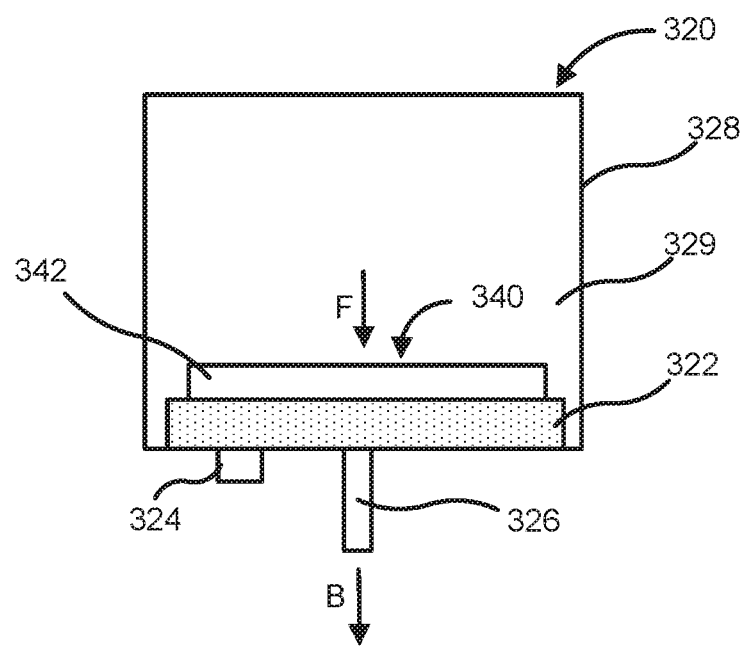
FIG. 3B is a schematic illustration of the reductant insertion assembly of FIG. 3A in a second position.

The compression mechanism 340 comprises a plate 342 which is formed from a rigid material (e.g., metal, plastics, etc.). The reductant insertion assembly 320 is movable between a first position shown in FIG. 3A, in which no compressive force is exerted on the reductant bladder 322, and a second position shown in FIG. 3B in which the reductant bladder 322 is compressed so as to force the reductant out thereof via the bladder outlet 326.

For example, in the first position the reductant bladder 322 is positioned between the inner surface the sidewall of the bladder housing 328, and the plate 342. The plate 342 does not exert a compressive force on the reductant bladder 322, so that no reductant is being communicated downstream of the reductant bladder 322.

In the second position, the plate 342 exerts a compressive force on the reductant bladder 322 as shown by the arrow F, for example responsive to a pressure signal from the pressure sensor 132, so as to expel the reductant from the reductant bladder 322 via the bladder outlet 326. For example, a piston, a cam, a lead screw, or any other driving mechanism may be operatively coupled to plate 342 and configured to urge the plate 342 towards the reductant bladder 322. The reductant bladder 322 may be compressed between the plate 342 and the inner surface of the sidewall of the bladder housing 328, thereby causing the reductant to be communicated out of the reductant bladder 322 via the bladder outlet 326, in a direction shown by the arrow B.

Figure 4A:
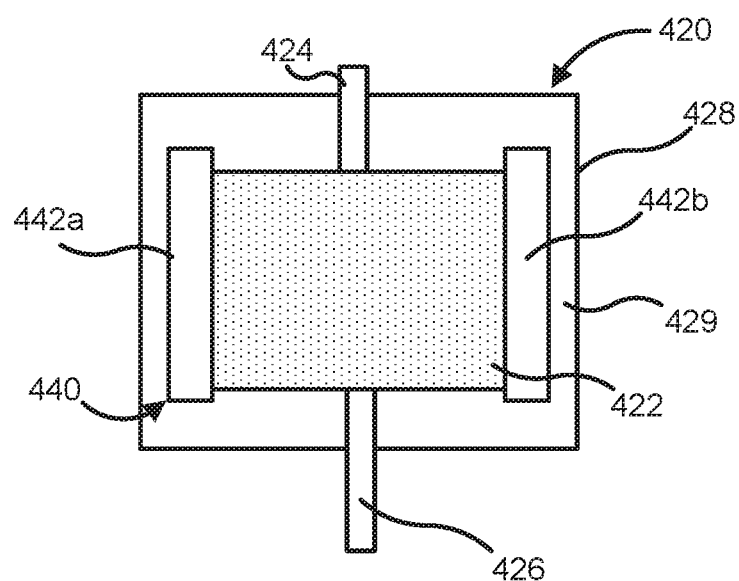
FIG. 4A is a schematic illustration of a reductant insertion assembly, according to yet another embodiment, in a first position.
Figure 4B:
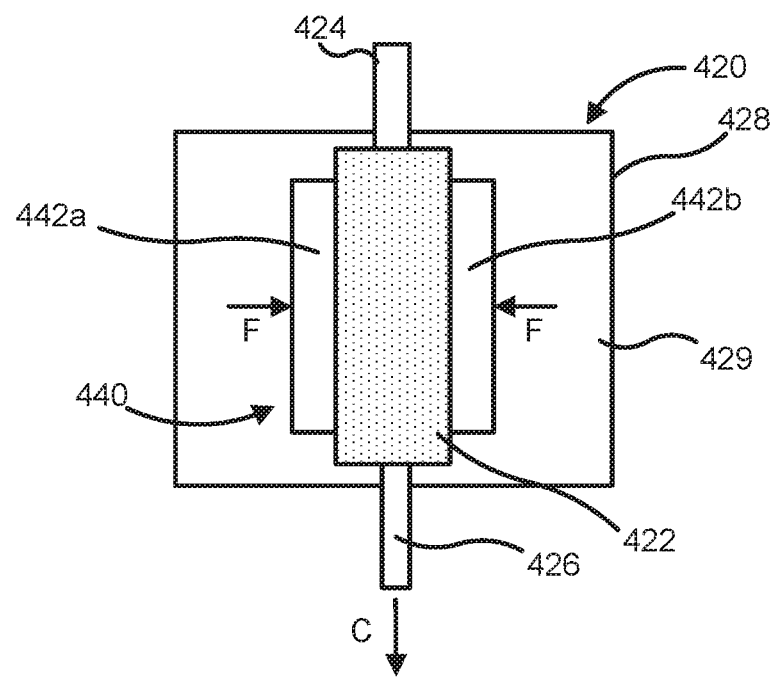
FIG. 4B is a schematic illustration of the reductant insertion assembly of FIG. 4A in a second position.

FIGS. 4A and 4B show a reductant insertion assembly 420 according to yet another embodiment. The reductant insertion assembly 420 may be used in the aftertreatment system 100 or any other aftertreatment system described herein. The reductant insertion assembly 420 comprises a reductant bladder 422 having a bladder inlet 424 and a bladder outlet 426, and a compression mechanism 440. The reductant bladder 422 is positioned within a bladder housing internal volume 429 of a bladder housing 428. The reductant bladder 422, and the bladder housing 428 may be substantially similarly to the reductant bladder 122 and the bladder housing 128, respectively as described with respect to the reductant insertion assembly 120 and, therefore not described in further detail herein.

The compression mechanism 440 comprises a first plate 442a and a second plate 442b (collectively referred to herein as "the plates 442"). The plates 442 are formed from a rigid material (e.g., metal, plastics, etc.). Furthermore, the reductant bladder 422 is positioned between the plates 442. The reductant insertion assembly 420 is movable between a first position shown in FIG. 4A, in which no compressive force is exerted on the reductant bladder 422, and a second position shown in FIG. 4B in which the reductant bladder 422 is compressed so as to force the reductant out thereof via the bladder outlet 426, in a direction shown by the arrow C.

In the first position, the plates 442 do not exert a compressive force on the reductant bladder 422, so that no reductant is being communicated downstream of the reductant bladder 422. In the second position, the plates 442 move towards each, for example responsive to a pressure signal from the pressure sensor 132, and exert a compressive force on the reductant bladder 422, so as to expel the reductant from the reductant bladder 422 via the bladder outlet 426. For example, a piston, a cam, a lead screw, or any other driving mechanism may be operatively coupled to each of the plates 442, and configured to urge the plates 442 towards each other, thereby compressing the reductant bladder 422 therebetween. In other embodiments, only one of the first plate 442a or the second plate 442b may is movable, while the other remains fixed so as to provide a rigid surface for the movable plate to compress the reductant bladder 422 against.

Figure 5A:
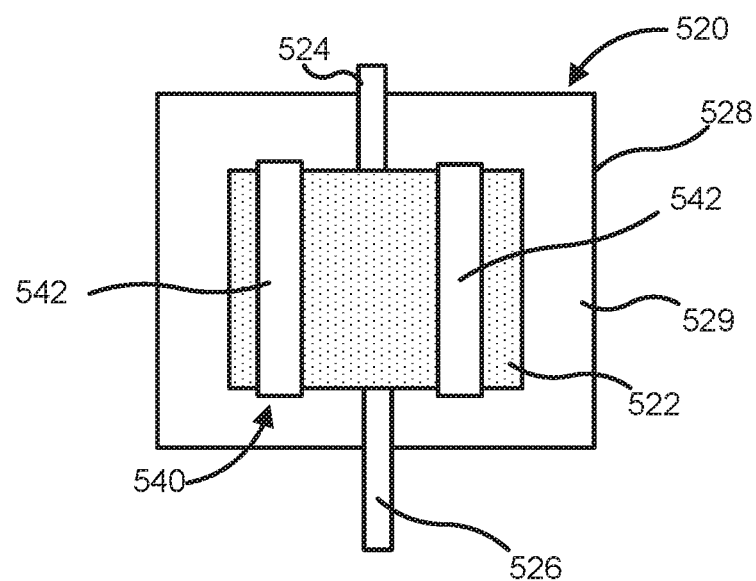
FIG. 5A is a schematic illustration of a reductant insertion assembly, according to still another embodiment, in a first position.
Figure 5B:
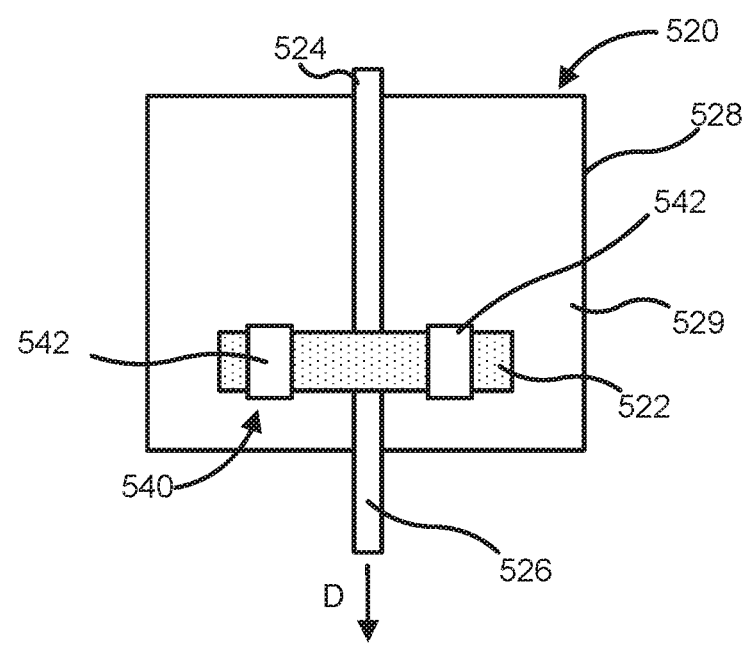
FIG. 5B is a schematic illustration of the reductant insertion assembly of FIG. 5A in a second position.

FIGS. 5A and 5B show a reductant insertion assembly 520 according to still another embodiment. The reductant insertion assembly 520 may be used in the aftertreatment system 100 or any other aftertreatment system described herein. The reductant insertion assembly 520 comprises a reductant bladder 522 having a bladder inlet 524, and a bladder outlet 526, and a compression mechanism 540. The reductant bladder 522 is positioned within a bladder housing internal volume 529 of a bladder housing 528. The reductant bladder 522, and the bladder housing 528 may be substantially similarly to the reductant bladder 122 and the bladder housing 128, respectively as described with respect to the reductant insertion assembly 120 and, therefore not described in further detail herein.

The compression mechanism 540 comprises a at least one band 542 positioned around the reductant bladder 522. For example, the compression mechanism 540 may include a plurality of bands 542 (e.g., 2, 3, 4, 5, 6 or any other suitable number) positioned around the reductant bladder 522. The bands 542 may be formed from any suitable material (e.g., metal, rubber, leather, fabric, plastics, elastomers, etc.). The reductant insertion assembly 520 is movable between a first position shown in FIG. 5A, in which no compressive force is exerted on the reductant bladder 522, and a second position shown in FIG. 5B in which the reductant bladder 522 is compressed by the at least one band 542 so as to force the reductant out thereof via the bladder outlet 526 via, in a direction shown by the arrow D.

In the first position, the at least one band 542 does not exert a compressive force on the reductant bladder 522, so that no reductant is being communicated downstream of the reductant bladder 522. For example, in the first position, the at least one band 542 may have a first band diameter corresponding to a first cross-section of the reductant bladder 522, for example a fully inflated cross-section of the reductant bladder 522, when the reductant bladder 522 is filled to its full capacity with the reductant.

In the second position, a band diameter of the at least one band 542 is reduced from the first band diameter to a second band diameter significantly smaller than the first band diameter. For example, the at least one band 542 may be looped around a buckle, a hook, or loop. The at least one band 542 may be pulled about the buckle, the hook, or the loop so as to reduce the band diameter to the second band diameter, for example responsive to a pressure signal from the pressure sensor 132. As the band diameter is reduced to the second band diameter, the at least one band 542 exerts a compressive force on the reductant bladder 522 so as to expel the reductant from the reductant bladder 522 via the bladder outlet 526, in a direction shown by the arrow D in FIG. 5B.

In some embodiments, the aftertreatment system 100 may also comprise a controller 170, as shown in FIG. 1 The controller 170 may comprise any suitable controller, for example the computing device 730. The controller 170 is operably coupled to the reductant insertion assembly 120, and configured to instruct the reductant insertion assembly 120 to receive the pressure signal from the pressure sensor 132. The controller 170 determines a pressure of the reductant in the bladder outlet 126, for example the reductant delivery line fluidly coupling the bladder outlet 126 to the injector 156, based on the pressure signal.

If the pressure is less than a predetermined low pressure threshold, as described before herein, the controller 170 may instruct the compression mechanism 140 (e.g., any of the compression mechanisms 240, 340, 440, or 540) to exert a compressive force on the reductant bladder 122. In various embodiments, the controller 170 may also be configured to instruct the compression mechanism 140 to remove the compressive force on the reductant bladder 122 if the pressure exceeds a high pressure threshold.

In various embodiments, the controller 170 may also be configured to determine an operating condition of the engine 10. For example, the controller 170 may be operatively coupled to the engine 10 and configured to receive an engine operating signal corresponding to an operating condition of the engine 10. A combination of the signals generated by the one or more sensors may be indicative of the operating condition of the engine 10. Such signals may comprise a vehicle speed (e.g., a vehicle including the engine 10 and the aftertreatment system 100), an engine speed of the engine 10, an engine torque of the engine 10, an exhaust gas mass flow emitted by the engine 10, a temperature of the exhaust gas at an inlet of the aftertreatment system 100, and/or an ambient temperature.

In various embodiments, the controller 170 may be configured to receive and interpret a first sensor signal from the first sensor 103 (e.g., a first NOx sensor) and/or a second sensor signal from the second sensor 105 (e.g., the second NOx sensor) so as to determine the operating condition of the engine 10. The controller 170 may use the engine operating signal, the first sensor signal and/or the second sensor signal to determine an amount of reductant to be inserted into the aftertreatment component 150.

Figure 6:
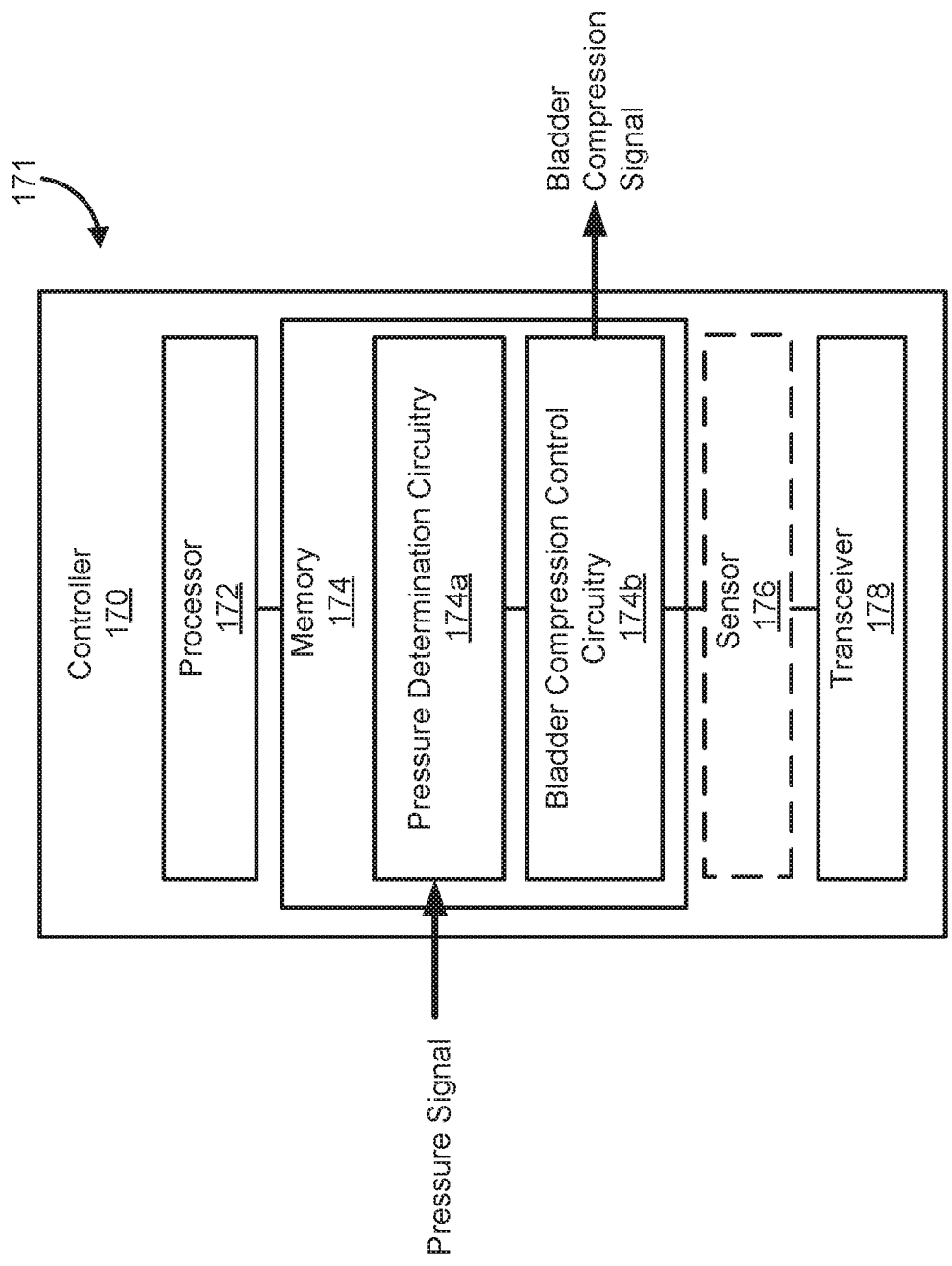
FIG. 6 is a schematic block diagram of a controller which may be included in the aftertreatment system of FIG. 1, according to an embodiment.
Figure 7:
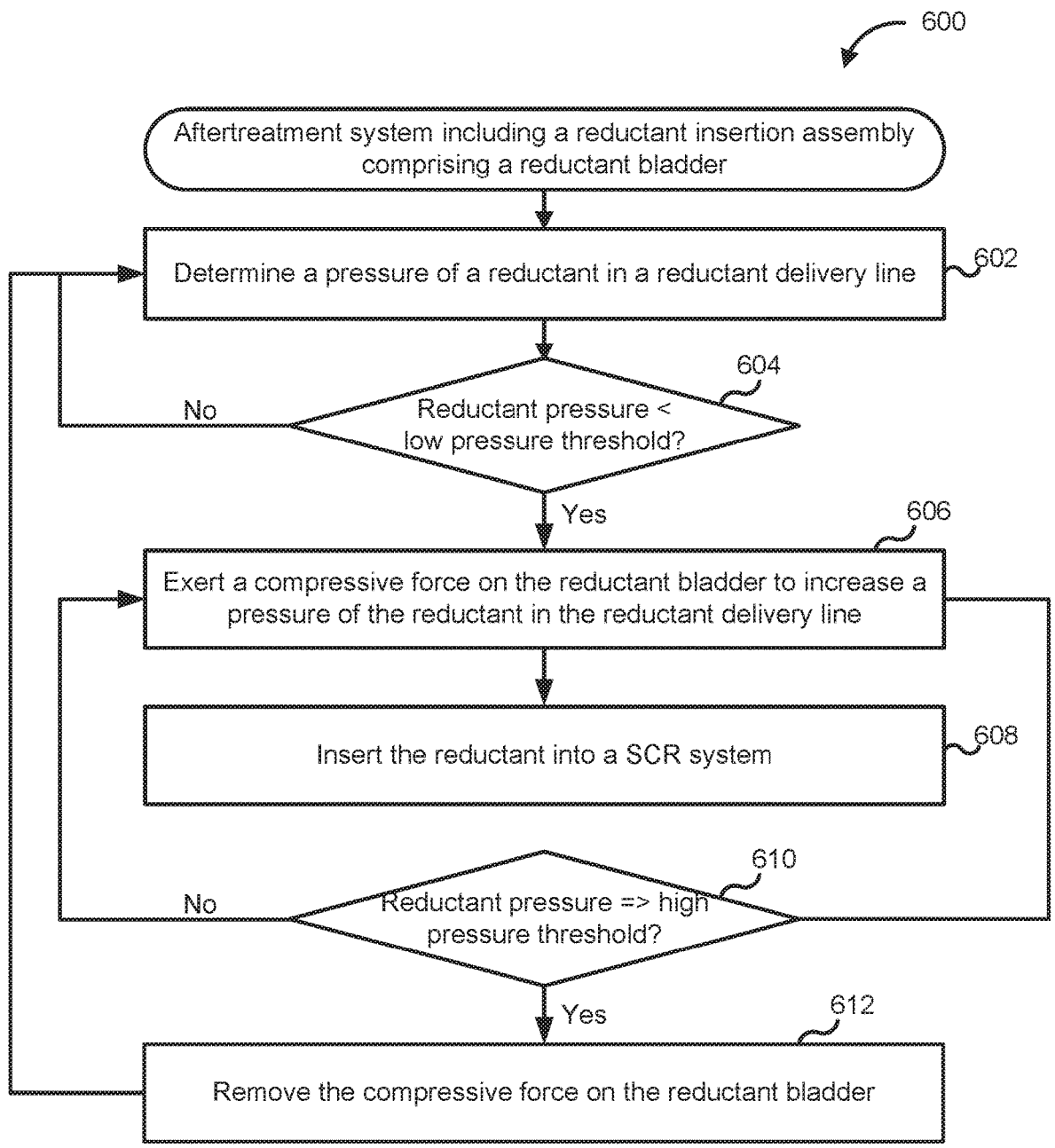
FIG. 7 is a schematic flow diagram of an example method for inserting a reductant into a SCR system.

In particular embodiments, the controller 170 can be included in a control circuitry. For example, FIG. 6 is a schematic block diagram of a control circuitry 171 that comprises the controller 170, according to an embodiment. The controller 170 comprises a processor 172, a memory 174, or any other computer readable medium, a transceiver 178, and a sensor 176. It should be understood that the controller 170 shows only one embodiment of the controller 170 and any other controller capable of performing the operations described herein can be used.

The processor 172 may comprise a microprocessor, programmable logic controller (PLC) chip, an ASIC chip, or any other suitable processor. The processor 172 is in communication with the memory 174 and configured to execute instructions, algorithms, commands, or otherwise programs stored in the memory 174.

The memory 174 comprises any of the memory and/or storage components discussed herein. For example, memory 174 may comprise a RAM and/or cache of processor 172. The memory 174 may also comprise one or more storage devices (e.g., hard drives, flash drives, computer readable media, etc.) either local or remote to controller 170. The memory 174 is configured to store look up tables, algorithms, or instructions.

For example, the memory 174 may comprise a pressure determination circuitry 174a. The pressure determination circuitry 174a is configured to receive the pressure signal from the pressure sensor 132, and determine the pressure of the reductant in the reductant delivery line downstream of the reductant insertion assembly 120. The pressure determination circuitry 174a determines if the pressure is less than the predetermined low pressure threshold.

The memory 174 also comprises a bladder compression control circuitry 174b configured to generate a bladder compression signal. The bladder compression signal may be communicated to the compression mechanism 140 so as to activate the compression mechanism 140 for compressing the reductant bladder 122. For example, if the pressure determination circuitry 174a determines that the reductant pressure is less than the predetermined low pressure threshold, the pressure determination circuitry 174a commands the bladder compression control circuitry 174b to generate the bladder compression signal, which instructs the compression mechanism 140 to exert the compressive force on the reductant bladder 122, thereby communicating the reductant into the reductant delivery line and increasing the reductant pressure therewithin.

In particular embodiments, the pressure determination circuitry 174a may also be configured to determine from the pressure signal, if the pressure is equal to or exceeds a predetermined high pressure threshold. If the pressure determination circuitry 174a determines that the pressure is equal to or exceeds the predetermined high pressure threshold, the pressure determination circuitry 174a may instruct the bladder compression control circuitry 174b to stop generating the bladder compression signal, for example to deactivate the compression mechanism 140.

In other embodiments, the pressure determination circuitry 174a may also be configured to instruct the bladder compression control circuitry 174b to generate a bladder compression signal which instructs the compression mechanism 140 to reverse a direction of the compressive force. For example, the compression mechanism 140 may comprise the pneumatic compression mechanism 240, and the bladder compression signal may be configured to instruct the pneumatic pump 242 to apply suction on the bladder housing internal volume 229. The suction may cause the reductant bladder 222 to expand and be filled with the reductant, while decreasing the pressure downstream to the reductant bladder 222 such that the reductant pressure downstream of the reductant bladder 222 falls below the predetermined high pressure threshold.

FIG. 3 is a schematic flow diagram of an example method 600 for inserting a reductant in an aftertreatment component (e.g., the aftertreatment component 150) of an aftertreatment system (e.g., the aftertreatment system 100) using a reductant insertion assembly (e.g., the reductant insertion assembly 120, 220, 320, 420, 520 or any other reductant insertion assembly described herein) which comprises a reductant bladder (e.g., the reductant bladder 122, 222, 322, 422, 522 or any other reductant bladder described herein).

The method 600 comprises determining a pressure of a reductant in a reductant delivery line fluidly coupled to a bladder outlet of the reductant bladder at 602. For example, the pressure sensor 132 may generate a pressure signal indicative of the pressure in the reductant delivery line downstream of the reductant bladder (e.g., the reductant bladder 122, 222, 322, 422, 522 or any other reductant bladder described herein). The pressure determination circuitry 174a may then determine the pressure in the reductant delivery line using the pressure signal.

It is determined if the pressure is less than a predetermined low pressure threshold at 604. For example, the pressure determination circuitry 174a determines if the pressure is less than the predetermined low pressure threshold, for example a minimum pressure of the reductant needed by the injector 156 to insert the reductant into the aftertreatment component 150.

If the pressure is greater than the predetermined low pressure threshold, the method 600 returns to operation 602. In response to the pressure being less than the predetermined low pressure threshold, a compressive force is exerted on the reductant bladder so as to increase a pressure of the reductant in the reductant delivery line at 606. For example, if the pressure determination circuitry 174a determines that the reductant pressure is less than the predetermined low pressure threshold, the pressure determination circuitry 174a commands the bladder compression control circuitry 174b to generate a bladder compression signal instructing the compression mechanism 140, 240, 340, 440, 540 or any other compression mechanism described herein to compress the reductant bladder (e.g., the reductant bladder 122, 222, 322, 422, 522 or any other reductant bladder described herein) so as to increase a pressure of the reductant in the reductant delivery line. The reductant is then inserted into an SCR system (e.g., the aftertreatment component 150) at 608.

In some embodiments, the method 600 may also comprise determining if the pressure is equal to or greater than a predetermined high pressure threshold at 610. For example, the pressure determination circuitry 174a may determine if the pressure is greater than the predetermined high pressure threshold using the pressure signal from the pressure sensor 132. If the pressure is less than the high pressure threshold, the method 600 returns to operation 606. In response to the pressure being equal to or greater the predetermined high pressure threshold, the compressive force is removed from the reductant bladder at 612.

For example, the pressure determination circuitry 174a may determine that the reductant pressure is equal to or higher than the predetermined high pressure threshold. The pressure determination circuitry 174a may then command the bladder compression control circuitry 174b to stop generating the bladder compression signal, thereby instructing the compression mechanism (e.g., the compression mechanism 140, 240, 340, 440, 540, etc.) to exert the compressive force on the reductant bladder (e.g., the reductant bladder 122, 222, 322, 422, 522, etc.). The method 600 than returns to operation 602.

Figure 8:
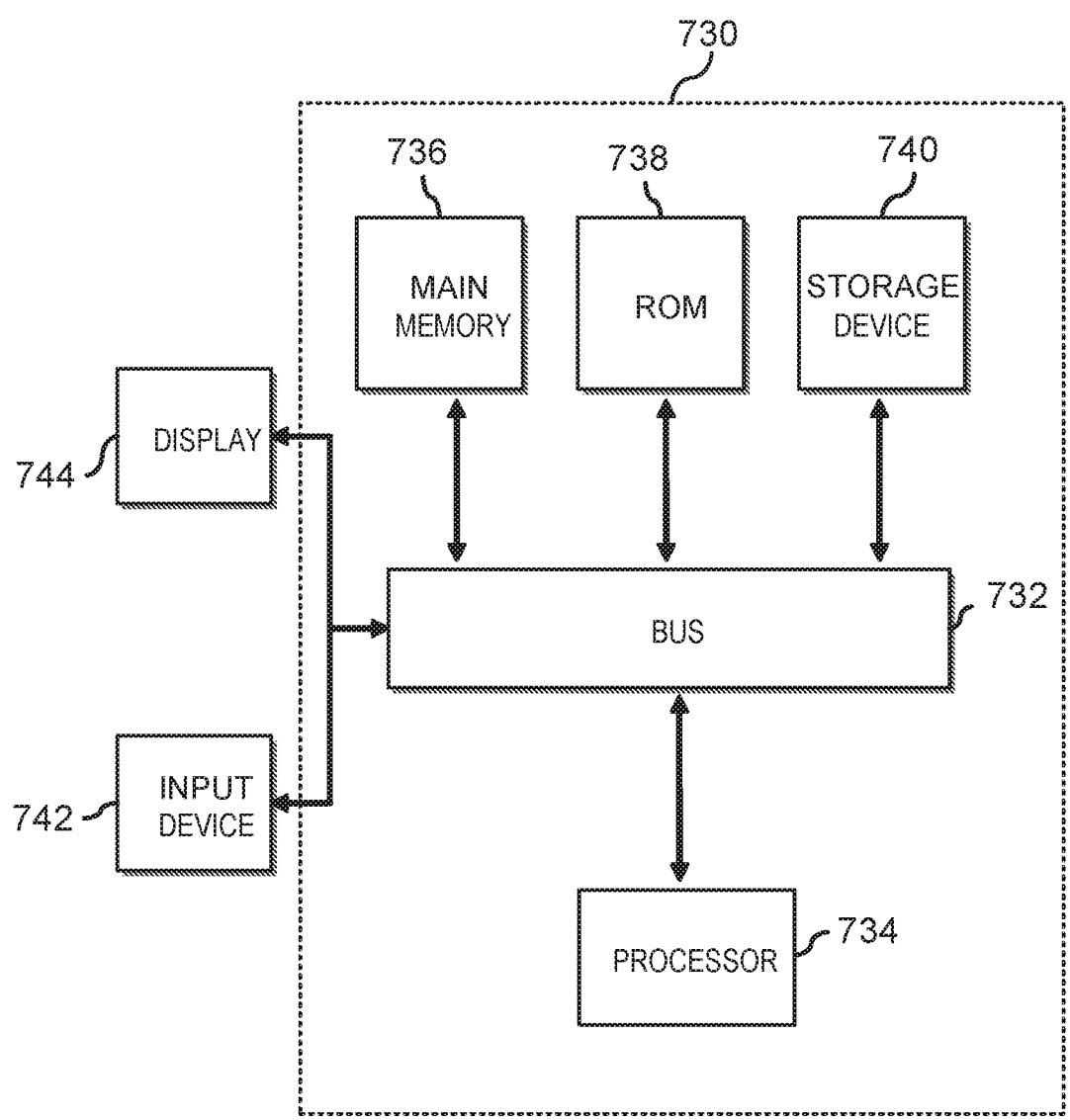
FIG. 8 is a schematic block diagram of a computing device which may be used as the controller shown in FIGS. 1 and/or 6.

In some embodiments, the controller 170, the control circuitry 171, or any of the controller or control circuitries described herein can comprise a system computer of an apparatus or system which comprises the aftertreatment system 100 (e.g., a vehicle, an engine or generator set, etc.). For example, FIG. 8 is a block diagram of a computing device 730 in accordance with an illustrative implementation. The computing device 730 can be used to perform any of the methods or the processes described herein, for example the method 600. In some embodiments, the controller 170 can comprise the computing device 730. The computing device 730 comprises a bus 732 or other communication component for communicating information. The computing device 730 can also comprise one or more processors 734 or processing circuits coupled to the bus 732 for processing information.

The computing device 730 also comprises main memory 736, such as a random access memory (RAM) or other dynamic storage device, coupled to the bus 732 for storing information and instructions to be executed by the processor 734. Main memory 736 can also be used for storing position information, temporary variables, or other intermediate information during execution of instructions by the processor 734. The computing device 730 may further comprise ROM 738 or other static storage device coupled to the bus 732 for storing static information and instructions for the processor 734. A storage device 740, such as a solid-state device, magnetic disk or optical disk, is coupled to the bus 732 for persistently storing information and instructions. For example, instructions corresponding operations of the method 600 can be stored on the storage device 740.

The computing device 630 may be coupled via the bus 632 to a display 644, such as a liquid crystal display or active matrix display, for displaying information to a user. An input device 642, such as a keyboard or alphanumeric pad, may be coupled to the bus 632 for communicating information and command selections to the processor 634. In another implementation, the input device 642 has a touch screen display 644.

According to various implementations, the processes and methods described herein can be implemented by the computing device 730 in response to the processor 734 executing an arrangement of instructions contained in main memory 736 (e.g., the operations of the method 600). Such instructions can be read into main memory 736 from another non-transitory computer-readable medium, such as the storage device 740. Execution of the arrangement of instructions contained in main memory 736 causes the computing device 730 to perform the illustrative processes described herein. One or more processors in a multi-processing arrangement may also be employed to execute the instructions contained in main memory 736. In alternative implementations, hard-wired circuitry may be used in place of or in combination with software instructions to effect illustrative implementations. Thus, implementations are not limited to any specific combination of hardware and software.

Although an example computing device has been described in FIG. 8, implementations described in this specification can be implemented in other types of digital electronic, or in computer software, firmware, or hardware, including the structures disclosed in this specification and their structural equivalents, or in combinations of one or more of them.

Implementations described in this specification can be implemented in digital electronic, or in computer software, firmware, or hardware, including the structures disclosed in this specification and their structural equivalents, or in combinations of one or more of them. The implementations described in this specification can be implemented as one or more computer programs (i.e., one or more circuitries of computer program instructions) encoded on one or more computer storage media for execution by, or to control the operation of, data processing apparatus. A computer storage medium comprises a non-transitory computer readable medium and can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources. The term "data processing apparatus" or "computing device" encompasses all kinds of apparatus, devices, and machines for processing data, including, by way of example, a programmable processor, a computer, a system on a chip, or multiple ones, or combinations of the foregoing. The apparatus can comprise special purpose logic, e.g., an FPGA (field programmable gate array) or an ASIC (application-specific integrated circuit). In addition to hardware, the apparatus can also comprise code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a circuitry, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuitries, sub-programs, or portions of code). A computer program can be deployed to be executed on one computer, on multiple computers that are located at one site, or distributed across multiple sites and interconnected by a communication network.

Processors suitable for the execution of a computer program comprise, by way of example, both general and special purpose microprocessors and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also comprise, or be operatively coupled to receive data from or transfer data to, or both, one or more mass storage devices for storing data (e.g., magnetic, magneto-optical disks, or optical disks). However, a computer need not have such devices. Devices suitable for storing computer program instructions and data comprise all forms of non-volatile memory, media and memory devices, including, by way of example, semiconductor memory devices (e.g., EPROM, EEPROM, and flash memory devices); magnetic disks (e.g., internal hard disks or removable disks); magneto-optical disks; and CD-ROM and DVD-ROM disks. The processor and the memory can be supplemented by, or incorporated in, special purpose logic.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements; values of parameters, mounting arrangements; use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes, and omissions may also be made in the design, operating conditions, and arrangement of the various exemplary embodiments without departing from the scope of the present application.

While this specification contains many specific implementation details, these should not be construed as limitations on the scope of any embodiments or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A reductant insertion assembly comprising:
a reductant bladder defining a bladder internal volume for holding a reductant, the reductant bladder comprising a bladder inlet and a bladder outlet;
a pressure sensor positioned downstream of the bladder outlet, the pressure sensor operable to sense a pressure of the reductant downstream of the reductant bladder, and generate a pressure signal indicative of the pressure; and
a compression mechanism operably coupled to the reductant bladder, the compression mechanism configured to selectively exert a compressive force on the reductant bladder so as to expel the reductant therefrom via the bladder outlet, the compression mechanism exerting the compressive force in response to the pressure signal.

2. The reductant insertion assembly of claim 1, further comprising an injector positioned downstream of the pressure sensor, the injector configured to selectively insert the reductant into a selective catalytic reduction system.

3. The reductant insertion assembly of claim 1, further comprising a bladder housing defining a bladder housing internal volume, the reductant bladder positioned within the bladder housing internal volume.

4. The reductant insertion assembly of claim 3, wherein the compression mechanism comprises a pneumatic pump configured to selectively pressurize the bladder housing internal volume so as to compress the reductant bladder and expel the reductant therefrom.

5. The reductant insertion assembly of claim 1, wherein the compression mechanism comprises at least one plate operably coupled to the reductant bladder, the at least one plate configured to selectively exert the compressive force on the bladder to expel the reductant therefrom.

6. The reductant insertion assembly of claim 1, wherein the compression mechanism comprises at least one band positioned around the reductant bladder, the at least one band configured to selectively exert the compressive force on the bladder to expel the reductant therefrom.

7. The reductant insertion assembly of claim 1, further comprising an inlet valve positioned at the bladder inlet, the inlet valve configured to selectively close so as to prevent backflow of the reductant from the bladder inlet when the compressive mechanism is exerting the compressive force.

8. The reductant insertion assembly of claim 1, further comprising an outlet valve positioned at the bladder outlet, the outlet valve configured to selectively close to allow the reductant bladder to be filled with the reductant when the compressive force is removed.

9. An aftertreatment system for use with an engine producing an exhaust gas, the aftertreatment system comprising:
a selective catalytic reduction system configured to decompose constituents of the exhaust gas; and
a reductant insertion assembly fluidly coupled to the selective catalytic reduction system and configured to insert a reductant therein, the reductant insertion assembly comprising:
a reductant bladder defining a bladder internal volume for holding a reductant, the reductant bladder comprising a bladder inlet and a bladder outlet,
a pressure sensor positioned downstream of the bladder outlet, the pressure sensor operable to sense a pressure of the reductant downstream of the reductant bladder, and generate a pressure signal indicative of the pressure, and
a compression mechanism operably coupled to the reductant bladder, the compression mechanism configured to selectively exert a compressive force on the reductant bladder so as to expel the reductant therefrom via the bladder outlet, the compression mechanism exerting the compressive force in response to the pressure signal.

10. The aftertreatment system of claim 9, wherein the reductant insertion assembly further comprises an injector positioned downstream of the pressure sensor and fluidly coupled to the selective catalytic reduction system, the injector configured to selectively insert the reductant into the selective catalytic reduction system.

11. The aftertreatment system of claim 9, wherein the reductant insertion assembly further comprises a bladder housing defining a bladder housing internal volume, the reductant bladder positioned within the bladder housing internal volume.

12. The aftertreatment system of claim 11, wherein the compression mechanism comprises a pneumatic pump, the pneumatic pump configured to selectively pressurize the bladder housing internal volume so as to compress the reductant bladder and expel the reductant therefrom.

13. The aftertreatment system of claim 9, wherein the compression mechanism comprises at least one plate operably coupled to the reductant bladder, the at least one plate configured to selectively exert the compressive force on the bladder to expel the reductant therefrom.

14. The aftertreatment system of claim 9, wherein the compression mechanism comprises at least one band positioned around the reductant bladder, the at least one band configured to selectively exert the compressive force on the bladder to expel the reductant therefrom.

15. The aftertreatment system of claim 9, further comprising a reductant storage tank fluidly coupled to the bladder inlet.

16. The aftertreatment system of claim 9, wherein the reductant insertion assembly further comprises an inlet valve positioned at the bladder inlet, the inlet valve configured to selectively close so as to prevent backflow of the reductant from the bladder inlet when the compressive mechanism is exerting the compressive force.

17. The aftertreatment system of claim 9, wherein the reductant insertion assembly further comprises an outlet valve positioned at the bladder outlet, the outlet valve configured to selectively close to allow the reductant bladder to be filled with the reductant when the compressive force is removed.

18. The aftertreatment system of claim 9, further comprising a controller operably coupled to the reductant insertion assembly, the controller configured to:
   receive the pressure signal from the pressure sensor;
   determine a pressure of the reductant in the bladder outlet; and
   if the pressure is less than a predetermined low pressure threshold, instruct the compression mechanism to exert a compressive force on the reductant bladder.

19. The aftertreatment system of claim 18, wherein the controller is further configured to, if the pressure exceeds a predetermined high pressure threshold, instruct the compression mechanism to remove the compressive force on the reductant bladder.

20. A method of delivering a reductant to an aftertreatment system from a reductant insertion assembly, the reductant assembly comprising a reductant bladder, the method comprising:
   determining, at a controller, by a pressure sensor positioned downstream of a bladder outlet of the reductant bladder, a pressure of a reductant downstream of the reductant bladder in a reductant delivery line fluidly coupled to the bladder outlet of the reductant bladder;
   determining, at the controller, if the pressure is less than a predetermined low pressure threshold; and
   in response to the pressure being less than the predetermined low pressure threshold, causing, by the controller, exertion of a compressive force on the reductant bladder so as to increase a pressure of the reductant in the reductant delivery line.

21. The method of claim 20, further comprising causing, by the controller, insertion of the reductant into a selective catalytic reduction system.

22. The method of claim 20, further comprising:
   determining, at the controller, if the pressure is equal to or greater than a predetermined high pressure threshold; and
   in response to the pressure being equal to or greater than the predetermined high pressure threshold, causing, by the controller, removal of the compressive force on the reductant bladder.

23. The method of claim 20, wherein the reductant insertion assembly further comprises a compression mechanism, the compression mechanism operably coupled to the reductant bladder and configured to exert the compressive force on the reductant bladder.

24. The method of claim 23, wherein the reductant insertion assembly further comprises a bladder housing defining a bladder housing internal volume, the reductant bladder positioned within the bladder housing internal volume, and wherein the compression mechanism comprises a pneumatic pump, the pneumatic pump configured to selectively pressurize the bladder housing internal volume so as to compress the reductant bladder and expel the reductant therefrom.

25. The method of claim 23, wherein the compression mechanism comprises at least one plate operably coupled to the reductant bladder, the at least one plate configured to selectively exert the compressive force on the reductant bladder to expel the reductant therefrom.

* * * * *